United States Patent
Zinger et al.

(10) Patent No.: US 12,223,168 B1
(45) Date of Patent: Feb. 11, 2025

(54) QUALITY OF SERVICE (QoS) ENFORCEMENT WITH LOW CONTENTION COMMAND PROCESSING

(71) Applicant: Dell Products L.P., Round Rock, TX (US)

(72) Inventors: Eldad Zinger, Raanana (IL); Elad Grupi, Pardes Hana (IL); Vitaly Zharkov, Modiin (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/228,149

(22) Filed: Jul. 31, 2023

(51) Int. Cl.
*G06F 3/06* (2006.01)

(52) U.S. Cl.
CPC ............ *G06F 3/061* (2013.01); *G06F 3/0659* (2013.01); *G06F 3/0679* (2013.01)

(58) Field of Classification Search
CPC ....... G06F 3/061; G06F 3/0659; G06F 3/0679
See application file for complete search history.

(56) References Cited

U.S. PATENT DOCUMENTS

| | | | |
|---|---|---|---|
| 7,417,962 B2 | 8/2008 | McBride | |
| 8,015,327 B1* | 9/2011 | Zahavi | G06F 11/3476 710/52 |
| 8,982,901 B2 | 3/2015 | Uppunda et al. | |
| 9,344,376 B2 | 5/2016 | Armstrong et al. | |
| 10,439,825 B1 | 10/2019 | Meyer et al. | |
| 2020/0142636 A1* | 5/2020 | Liao | G06F 9/546 |
| 2021/0132858 A1* | 5/2021 | Kamran | G06F 3/061 |
| 2021/0191650 A1* | 6/2021 | Vansteenkiste | H04L 67/1097 |

* cited by examiner

*Primary Examiner* — Edward J Dudek, Jr.
(74) *Attorney, Agent, or Firm* — BainwoodHuang (57) ABSTRACT

Technology is disclosed for QoS (Quality of Service) enforcement with reduced contention. For commands where the QoS wait queue is empty and the QoS credit count is sufficient, an atomic operation subtracts the credits required to process the command from the QoS credit count without locking, and the command is processed. For other commands, credit generation is attempted by first reading a lock flag without obtaining a lock. If the lock flag is clear, an atomic operation sets it, and credit generation is performed if sufficient time has passed since a last credit generation. Credit generation stores a sum of the current QoS credit count and the number of newly generated credits into a local credit count, and processes commands in the QoS wait queue for which sufficient credits exist in the local credit count. When credit generation completes, the local credit count is stored into the QoS credit count.

15 Claims, 5 Drawing Sheets

QUALITY OF SERVICE (QoS) ENFORCEMENT WITH LOW CONTENTION COMMAND PROCESSING

TECHNICAL FIELD

The present disclosure relates generally to data storage systems that enforce Quality of Service (QOS) policies with regard to the host Input/Output (I/O) commands they receive and process.

BACKGROUND

Data storage systems are arrangements of hardware and software that are coupled to non-volatile data storage drives, such as solid state drives and/or magnetic disk drives. The data storage system services host I/O commands received from physical and/or virtual host machines ("hosts"). The host I/O commands received by the data storage system specify host data that is written and/or read by the hosts. The data storage system executes software that processes the host I/O commands by performing various data processing tasks to efficiently organize and persistently store the host data in the non-volatile data storage drives of the data storage system.

Data storage systems may enforce QOS policies provided by the hosts. In this regard, the data storage system may operate as a traffic limiter with regard to host I/O commands it receives that are directed to objects with which the QoS policies are associated. Examples of the per-object QoS policies that may be enforced by a data storage system include maximum bandwidth (e.g. megabytes or gigabytes per second), which defines an upper limit on the rate at which data may be transferred to and/or from an object, and maximum I/O rate (e.g. I/O operations per second), which defines an upper limit on the rate at which host I/O commands directed to an object may be processed.

SUMMARY

Each QoS policy is associated with a QoS bucket that is used to enforce that QoS policy on received host I/O commands that are directed to the corresponding object. Credits are units used enforce a limit set by the QoS policy. For example, if the QoS policy sets a limit on maximum bandwidth, the enforced limit may be set in bytes per second, and each credit used to enforce the limit may accordingly be equal to a predetermined number of bytes, e.g. one byte, one kilobyte, etc. Each received host I/O command requires a specific number of credits to be processed, determined based on the amount of host data written or read by the command. New available credits are generated over time, and each QoS bucket includes an available credits counter, referred to as the QOS credit count for the QoS bucket. Each QoS bucket also includes a QoS wait queue that is used to delay processing of received host I/O commands at times of insufficient credit availability.

The disclosed technology provides Quality of Service (QOS) enforcement in a data storage system. For each host I/O command received by the data storage system, a QoS bucket is obtained for the host I/O command. The QoS bucket for each host I/O command corresponds to a storage volume indicated by that host I/O command, e.g. the storage volume that is written or read by the command. Each QoS bucket includes i) a QoS credit count, ii) a QoS wait queue, and iii) a lock flag. For each one of the host I/O commands received by the data storage system for which i) the QoS wait queue in the QoS bucket for the host I/O command is empty and ii) the QoS credit count in the QoS bucket for the host I/O command is at least as large as a number of credits required to process the host I/O command, an atomic operation is performed that subtracts the number of credits required to process the host I/O command from the QoS credit count in the QoS bucket for the host I/O command without locking the QoS bucket for the host I/O command, and the host I/O command is then processed.

In some embodiments, for each one of the host I/O commands for which the QoS wait queue is non-empty and for each one of the host I/O commands for which the number of credits required to process the host I/O command is larger than the QoS credit count in the QoS bucket for the host I/O command, the disclosed technology reads the lock flag in the QoS bucket for the host I/O command to determine whether the lock flag is set. In response to a determination that the lock flag in the QoS bucket for the host I/O command is set, a command descriptor for the host I/O command is enqueued onto the QoS wait queue in the QoS bucket for the host I/O command. In response to a determination that the lock flag in the QoS bucket for the host I/O command is not set, the disclosed technology i) performs an atomic operation to set the lock flag in the QoS bucket for the host I/O command, and ii) performs credits generation for the QoS bucket for the host I/O command.

In some embodiments, the disclosed technology performs credits generation for the QoS bucket for the host I/O command by calculating an amount of time since credits generation was last performed for the QoS bucket for the host I/O command, and comparing an amount of time since credits generation was last performed for the QoS bucket for the host I/O command to a minimum credit generation time period. In response to determining that the amount of time since credits generation was last performed for the QoS bucket for the host I/O command is less than the minimum credit generation time period, the disclosed technology completes credits generation for the QoS bucket for the host I/O command without generating any new credits for the QoS bucket.

In some embodiments, performing credits generation for the QoS bucket for the host I/O command further includes, in response to determining that the amount of time since credits generation was last performed for the QoS bucket for the host I/O command is at least as large as the minimum credit generation time period, a) calculating new credits for the QoS bucket for the host I/O command based on a QoS policy for the QoS bucket and the amount of time since credits generation was last performed for the Qos bucket for the host I/O command, b) storing a result of adding the new credits for the QoS bucket for the host I/O command to the QoS credit count in the QoS bucket for the host I/O command into a local credit count, and, c) for each command descriptor in the QoS wait queue in the QoS bucket for the host I/O command: i) processing a corresponding host I/O command, and ii) subtracting a required number of credits that is required to process the corresponding host I/O command from the local credit count. The local credit count is then stored into the QoS credit count in the QoS bucket for the host I/O command, and credits generation is completed for the QoS bucket for the host I/O command.

In some embodiments, for each one of the host I/O commands for which the QoS wait queue is non-empty and for each one of the host I/O commands for which the number of credits required to process the host I/O command is larger than the QoS credit count in the QoS bucket for the host I/O command, after credits generation for the Qos bucket for the host I/O command is completed, the disclosed technology clears the lock flag in the QoS bucket for the host I/O command, and, in response to i) the QoS wait queue in the QoS bucket for the host I/O command being empty, and ii) the QoS credit count in the QoS bucket for the host I/O command being at least as large as the number of credits required to process the host I/O command, i) performs an atomic operation that subtracts the total number of credits required to process the host I/O command from the QoS credit count in the QoS bucket for the host I/O command without locking the QoS bucket for the host I/O command, and ii) processes the host I/O command.

The disclosed technology is integral to a practical technical solution for performing QoS policy enforcement while reducing contention for shared QoS resources. By allowing host I/O commands to be processed when the QoS credit count is determined to be large enough, without locking the QoS bucket for each host I/O command, the disclosed technology allows credit counts to effectively go negative in some situations. Such situations may arise when a host I/O command is allowed to be processed at a time when sufficient credits appear to be available, but are not actually available, because some or all of the credits in the relevant credit counter have already been consumed by a concurrently executing command processing thread that allowed another host I/O command directed to the same managed object (e.g. the same storage volume) to be processed. Under these conditions, the effective negative credits are considered to be borrowed from the future, and will be made up for later as new credits are generated. The limit set by the QoS policy is still maintained when the allowed rate is averaged over time. Advantageously, there is low contention for QoS bucket resources that are shared by different threads processing different host I/O commands directed to the same managed object, resulting in high levels of concurrent processing, thus providing improved performance for the data storage system in terms of relatively higher host I/O command processing bandwidth and/or throughput in comparison to systems without the disclosed technology.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Embodiments will now be described with reference to the figures. The embodiments described herein are provided only as examples, in order to illustrate various features and principles of the disclosed technology, and are not limiting. The embodiments of disclosed technology described herein are integrated into a practical solution for performing QoS policy enforcement while providing low levels of contention for shared QoS resources.

As further described below, in various embodiments, the disclosed technology provides Quality of Service (QOS) enforcement in a data storage system. For each host I/O command received by the data storage system, a QoS bucket is obtained for the host I/O command. The QoS bucket for each host I/O command corresponds to a storage volume indicated by that host I/O command, e.g. the storage volume that is written or read by the command. Each QoS bucket includes i) a QoS credit count, ii) a QoS wait queue, and iii) a lock flag. For each one of the host I/O commands received by the data storage system for which the data storage system determines that i) the QoS wait queue in the QoS bucket for the host I/O command is empty and ii) the QoS credit count in the QoS bucket for the host I/O command is at least as large as a number of credits required to process the host I/O command, the data storage system performs an atomic operation that subtracts a total number of credits required to process the host I/O command from the QoS credit count in the QoS bucket for the host I/O command without locking the QoS bucket for the host I/O command. The host I/O command is then processed by the data storage system.

For each one of the host I/O commands for which the QoS wait queue is determined to be non-empty, and for each one of the host I/O commands for which the number of credits required to process the host I/O command is determined to be larger than the QoS credit count in the QoS bucket for the host I/O command, the data storage system reads the lock flag in the QoS bucket for the host I/O command to determine whether the lock flag is set. In response to a determination that the lock flag in the QoS bucket for the host I/O command is set, the data storage system enqueues a command descriptor for the host I/O command onto the QoS wait queue in the QoS bucket for the host I/O command. In response to a determination that the lock flag in the QoS bucket for the host I/O command is not set, the data storage system i) performs an atomic operation to set the lock flag in the QoS bucket for the host I/O command, and ii) performs credits generation for the QoS bucket for the host I/O command.

The data storage system may perform credits generation for the QoS bucket for the host I/O command by calculating an amount of time since credits generation was last performed for the QoS bucket for the host I/O command, and comparing an amount of time since credits generation was last performed for the QoS bucket for the host I/O command to a minimum credit generation time period. In response to determining that the amount of time since credits generation was last performed for the QoS bucket for the host I/O command is less than the minimum credit generation time period, the data storage system may complete credits generation for the QoS bucket for the host I/O command without generating any new credits for the QoS bucket.

The data storage system further performs credits generation for the QoS bucket for the host I/O command at least in part by, in response to the amount of time since credits generation was last performed for the QoS bucket for the host I/O command being at least as large as the minimum credit generation time period, a) calculating new credits for the QoS bucket for the host I/O command based on a QoS policy for the QoS bucket and the amount of time since credits generation was last performed for the QoS bucket for the host I/O command, b) storing a result of adding the new credits for the QoS bucket for the host I/O command to the QoS credit count in the QoS bucket for the host I/O command into a local credit count, and, c) for each command descriptor in the Qos wait queue in the QoS bucket for the host I/O command, and for which there are sufficient available credits remaining in the local credit count to process completely: i) process a corresponding host I/O command, and ii) subtract a required number of credits that is required to process the corresponding host I/O command from the local credit count. The local credit count is then stored into the QoS credit count in the QoS bucket for the host I/O command, and credits generation is completed for the QoS bucket for the host I/O command.

For each one of the host I/O commands for which the QoS wait queue is determined to be non-empty and for each one of the host I/O commands for which the number of credits required to process the host I/O command is determined to be larger than the QoS credit count in the QoS bucket for the host I/O command, after credits generation for the QoS bucket for the host I/O command is completed, the data storage system clears the lock flag in the QoS bucket for the host I/O command, and, in response to i) a determination that the QoS wait queue in the QoS bucket for the host I/O command being empty, and ii) a determination that the QoS credit count in the Qos bucket for the host I/O command being at least as large as the number of credits required to process the host I/O command, i) performs an atomic operation that subtracts the total number of credits required to process the host I/O command from the QoS credit count in the QoS bucket for the host I/O command without locking the QoS bucket for the host I/O command, and ii) processes the host I/O command.

Figure 1:
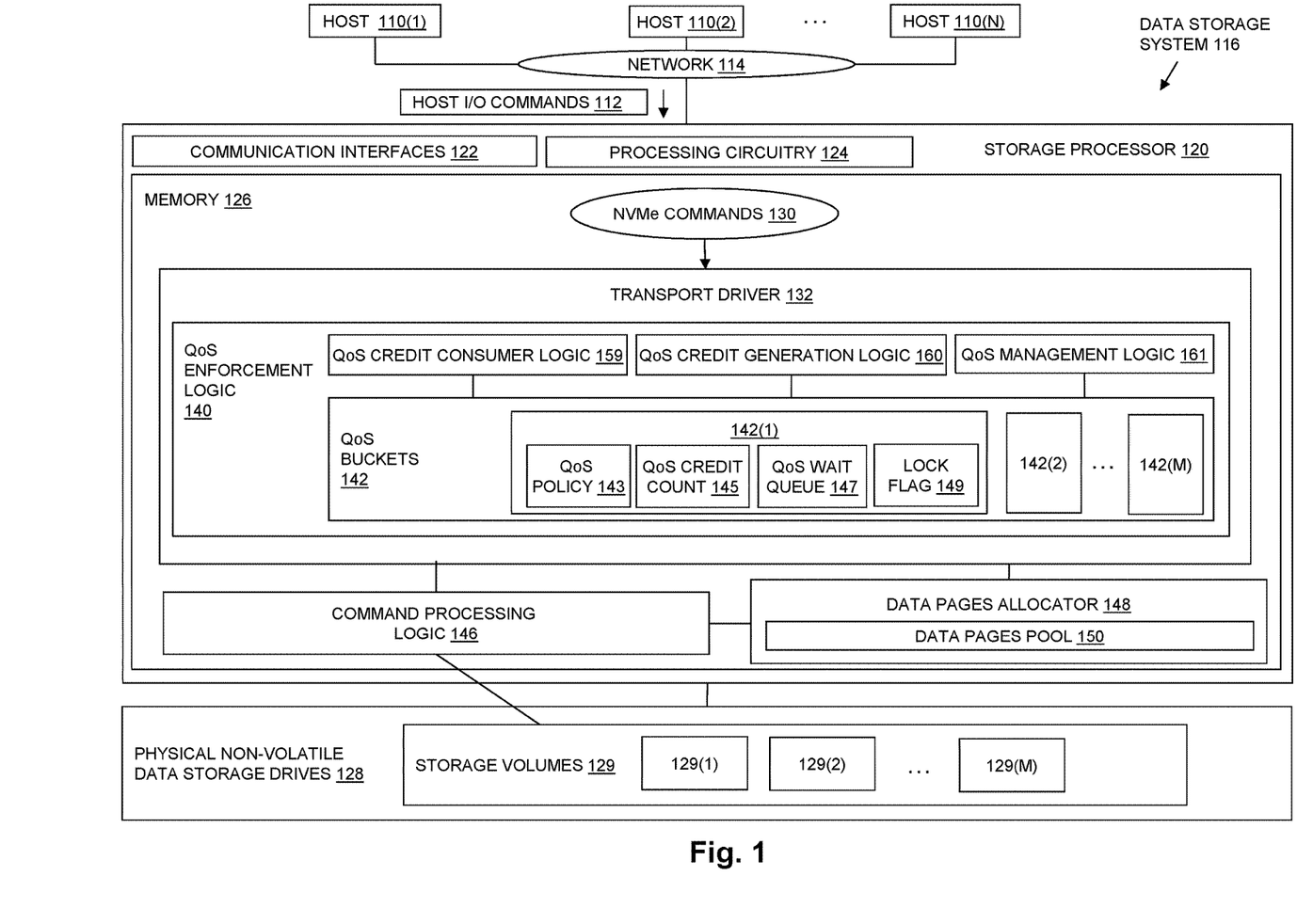
FIG. 1 is a block diagram showing an illustrative example of components in a data storage system including an embodiment of the disclosed technology.

FIG. 1 is a block diagram showing an operational environment for the disclosed technology, including an example of a data storage system in which the disclosed technology is embodied. FIG. 1 shows a number of physical and/or virtual Host Computing Devices 110, referred to as "hosts", and shown for purposes of illustration by Hosts 110(1) through 110(N). The hosts and/or applications executing thereon may access non-volatile data storage provided by Data Storage System 116, for example over one or more networks, such as a local area network (LAN), and/or a wide area network (WAN) such as the Internet, etc., and shown for purposes of illustration in FIG. 1 by Network 114. Alternatively, or in addition, one or more of Hosts 110 and/or applications accessing non-volatile data storage provided by Data Storage System 116 may execute within Data Storage System 116.

Data Storage System 116 includes at least one Storage Processor 120 that is communicably coupled to both Network 114 and Physical Non-Volatile Data Storage Drives 128, e.g. at least in part though one or more Communication Interfaces 122. No particular hardware configuration is required, and Storage Processor 120 may be embodied as any specific type of device that is capable of processing host input/output (I/O) commands (e.g. I/O read commands and I/O write commands, etc.), and of persistently storing host data.

The Physical Non-Volatile Data Storage Drives 128 may include physical data storage drives such as solid state drives, magnetic disk drives, hybrid drives, optical drives, and/or other specific types of drives. Physical Non-Volatile Data Storage Drives 128 include Storage Volumes 129, e.g. storage volumes 129(1) through 129(M). The Storage Volumes 129 are individually identifiable logical units of non-volatile data storage within Physical Non-Volatile Data Storage Drives 128 that are accessible by Hosts 110.

A Memory 126 in Storage Processor 120 stores program code that is executed on Processing Circuitry 124, as well as data generated and/or processed by such program code. Memory 126 may include volatile memory (e.g. RAM), and/or other types of memory.

Processing Circuitry 124 includes or consists of multiple processor cores within one or more multi-core processor packages. Each processor core is made up of electronic circuitry that is capable of independently executing instructions. Multiple different threads of execution may concurrently be executed on different ones of the processor cores. Such concurrently executing threads may include threads processing different ones of the Host I/O Commands 112.

Processing Circuitry 124 and Memory 126 together form control circuitry that is configured and arranged to carry out various methods and functions described herein. The Memory 126 stores a variety of software components that may be provided in the form of executable program code. For example, Memory 126 may include software components such as Transport Driver 132, QoS Enforcement Logic 140 within Transport Driver 132, Command Processing Logic 146, and Data Pages Allocator 148.

When program code stored in Memory 126 is executed by Processing Circuitry 124, Processing Circuitry 124 is caused to carry out the operations of the software components described herein. Although certain software components are shown in the Figures and described herein for purposes of illustration and explanation, those skilled in the art will recognize that Memory 126 may also include various other specific types of software components.

In the example of FIG. 1, Host I/O Commands 112 include Non-Volatile Memory Express (NVMe) protocol commands issued by Hosts 110 to Data Storage System 116 (NVMe Commands 130). The NVMe Commands 130 issued by Hosts 110 to Data Storage System 116 are received and processed by the combination of Transport Driver 132, Command Processing Logic 146, and Data Pages Allocator 148. Transport Driver 132, Command Processing Logic 146, and Data Pages Allocator 148 may accordingly be considered a software stack that is responsible for receiving and processing NVMe commands issued by Hosts 110 to Data Storage System 116. Host I/O Commands 112 may include commands other than Non-Volatile Memory Express (NVMe) protocol commands, e.g. SCSI (Small Computer System Interface) commands, which may be initially received and processed by other software components (not shown) also executing in Data Storage System 116.

During operation of the components shown in FIG. 1, NVMe Commands 130 are initially received by Transport Driver 132. Multiple received NVMe commands may be processed concurrently by Transport Driver 132, Command Processing Logic 146, and/or Data Pages Allocator 148. For example, each individual NVMe command may be processed by a thread of execution that executes on one of the multiple processor cores in Processing Circuitry 124, at the same time as one or more other threads of execution processing one or more other NVMe commands are executing on other ones of the processor cores.

As further described herein, Transport Driver 132 may perform QoS (Quality of Service) policy enforcement by executing QoS Enforcement Logic 140, before or after using Data Pages Allocator 148 to allocate any pages of memory from Data Pages Pool 150 that are needed to temporarily store host data while the command is being processed. For example, Data Pages Pool 150 may be a dedicated pool of memory pages that are specifically made available by Data Pages Allocator 148 only for allocation (e.g. by Transport Driver 132) to support processing of NVMe commands received by Data Storage System 116.

Hosts 110 define QoS policies, each of which is associated with a corresponding managed object that in Data Storage System 116 that is accessible to one or more of the Hosts 110. For example, a QoS policy may be defined for each one of the Storage Volumes 129. Examples of per-storage volume QoS policies that may be enforced by QoS Enforcement Logic 140 are maximum bandwidth (e.g. megabytes or gigabytes per second), which defines an upper limit on the rate at which data may be transferred to and/or from a storage volume, and maximum I/O rate (e.g. I/O operations per second), which defines an upper limit on the rate at which host I/O commands directed to a storage volume may be processed.

Each QoS policy is associated with (e.g. contained within) a QoS bucket that is used to enforce that QoS policy on received host I/O commands that are directed to the corresponding storage volume. In FIG. 1, QoS Buckets 142 include QoS Bucket 142(1), QoS Bucket 142(2), and so on through QoS Bucket 142(M), each of which corresponds to a respective one of the Storage Volumes 129.

Credits are units related to a limit set by the QoS policy. For a QoS policy setting a limit on maximum bandwidth for a storage volume, the limit may be set in bytes per second, and each credit may be equal to some predetermined number of bytes. For example, each credit may be equal to one byte, or, alternatively, each credit may be equal to one kilobyte.

As further described herein, Transport Driver 132 determines, for each received NVMe command, a specific number of credits that is required for that command to be processed, based on the amount of host data written or read by the command. For example, to enforce a maximum bandwidth QoS policy for a storage volume, in an embodiment in which each credit represents one byte, when an NVMe read command is received from a host requesting that ten kilobytes (10 KB) of host data be read from that storage volume and returned to the host, QoS Enforcement Logic 140 determines that the required number of credits that must be available to process the command is 10,240 credits.

New available credits are generated over time, and each QoS bucket includes an available credits counter, referred to as the QoS credit count for that QoS bucket. The value of a QoS credit count at any given time is the current number of credits that are available to be consumed in order to process NVMe commands that are directed to the storage volume corresponding to the QoS bucket that contains that QoS credit count. For example, in the case where a QoS credit count has a value of one million, then one million credits are currently available to be consumed in order to process NVMe commands that are directed to the storage volume corresponding to the QoS bucket containing that QoS credit count. As NVMe commands are processed that are directed to a given storage volume, the credits required to process each one of those NVMe commands are subtracted from the QoS credit count in the QoS bucket corresponding to that storage volume.

New QoS credits are added to a QoS credit count over time, at a rate based on the QoS policy being enforced. For example, as further described herein, in the case of a maximum bandwidth QoS policy, new QoS credits are added over time to the QoS credit count at a rate that reflects the maximum bandwidth limit being enforced.

QOS Enforcement Logic 140 determines whether there are sufficient credits available to process a received host I/O command (e.g. NVMe command) by comparing the number of credits required to process the command to the current value of the QoS credit count in the QoS bucket corresponding to the storage volume to which the command is directed. In the example of enforcing a maximum bandwidth QoS policy for a storage volume, where each credit represents one byte, and an NVMe is received that requires 10,240 credits to be processed, and the QoS credit count in the QoS bucket corresponding to the storage volume to which the command is directed is determined to have a current value of one million, then sufficient credits are determined to be available to immediately process the command. Alternatively, in the case where the QoS credit count in the QoS bucket corresponding to the storage volume to which the same command is directed is determined to have a current value of only 1024, then a determination is made that there are insufficient credits to immediately process the command, and processing of the command is delayed.

Each QoS bucket also includes a QoS wait queue. The QoS wait queue is used to delay processing of each host I/O command (e.g. NVMe command) that is directed to the corresponding storage volume when a determination is made that there are currently insufficient credits in the QoS credit count to immediately process the command. A command descriptor for each such command is enqueued onto the QoS wait queue, and is later dequeued from the QoS wait queue at a time when sufficient credits are available for the command to be processed, causing the command to be processed at that time.

In the illustrative embodiment of FIG. 1, each one of the QoS Buckets 142 contains a QoS policy, a QoS credit count, a QoS wait queue, and a lock flag. For purposes of illustration, the QoS Bucket 142(1) is shown including QoS Policy 143, QoS Credit Count 145, QoS Wait Queue 147, and Lock Flag 149. The other QoS buckets in QOS Buckets 142 similarly each include their own QoS policy, QoS credit count, Qos wait queue, and lock flag.

QOS Enforcement Logic 140 includes QoS Management Logic 160. When executed, e.g. in response to management requests received by Data Storage System 116 from users or hosts, QoS Management Logic 160 updates managed objects and related data structures. Such updating may, for example, perform management operations such as adding a QoS bucket, deleting a QoS bucket, attaching a QoS bucket to a managed object (e.g. storage volume), or detaching a QoS bucket from a managed object.

As previously mentioned, Transport Driver 132 invokes QoS Enforcement Logic 140 to perform Quality of Service (QOS) enforcement for each one of the received NVMe Commands 130. When QoS Enforcement Logic 140 is invoked for a received NVMe command, QoS Credit Consumer Logic 159 is executed for that command. QoS Credit Consumer Logic 159 disables local CPU preemption on the processor core on which it is executing. Such disabling effectively provides an RCU (Read, Copy, Update) read lock that prevents the operating system from preempting the execution of QoS Credit Consumer Logic 159 (e.g. prevents preemption by another thread executing the QoS Management Logic 160) until QoS Credit Consumer Logic 159 subsequently re-enables pre-emption, when QoS Credit Consumer Logic 159 completes and returns. Accordingly, QoS Management Logic 160 is not run until a time when no processor cores are currently executing QoS Credit Consumer Logic 159, and accordingly all processor cores allow preemption.

QOS Credit Consumer Logic 159 obtains a QoS bucket for the NVMe command for which QoS enforcement is being performed. For example, in the case of an NVMe command directed to Storage Volume 129(1) (e.g. a read command requesting data stored in Storage Volume 129(1), or a write command that writes data to Storage Volume 129(1)), QOS Credit Consumer Logic 159 identifies QoS Bucket 142(1) as the QoS bucket corresponding to Storage Volume 129(1), and obtains a pointer to QoS Bucket 142(1) using a single memory access. For example, QoS Credit Consumer Logic 159 may index a QoS bucket lookup table or the like with an identifier of, or value corresponding to, Storage Volume 129(1), in order to obtain a pointer to Storage Volume 129(1). In this way, QoS Credit Consumer Logic 159 can perform subsequent operations using QoS Bucket 142(1) based on that initially obtained pointer, without having to repeatedly use a QoS bucket lookup table to access QoS Bucket 142(1). This avoids problems that may result from modifications being made to the QoS bucket lookup table by management operations being performed while QoS Credit Consumer Logic 159 is executing.

For each one of the NVMe commands in NVMe Commands 130, QOS Credit Consumer Logic 159 determines whether the QoS wait queue in the QoS bucket for the command is empty, and whether the QoS credit count in the QoS bucket for the command is at least as large as the number of credits required to process the NVMe command. For example, in the case of an NVMe command directed to Storage Volume 129(1), QOS Credit Consumer Logic 159 determines whether the QoS Wait Queue 147 is empty, and whether the current value of QOS Credit Count 145 is at least as large as the number of credits required to process the command.

For each of those NVMe commands in NVMe Commands 130 for which QoS Credit Consumer Logic 159 determines that i) the QoS wait queue in the QoS bucket for the command is empty and ii) the QoS credit count in the QoS bucket for the command is at least as large as a number of credits required to process the command, QoS Credit Consumer Logic 159 performs an atomic decrement operation that subtracts a total number of credits required to process the command from the QoS credit count in the QoS bucket for the command without locking the QoS bucket for the host I/O command. For example, QoS Credit Consumer Logic 159 may perform an "atomic_sub" operation that atomically subtracts a value (i.e. the number of credits required to process the command) from a counter (i.e. the current value of the QoS credit count in the QoS bucket for the command). Any atomic operation cannot be interrupted on the processor core on which it is performed. The "atomic_sub" operation is performed such that instead of executing three discrete commands that i) load QoS credit count from memory to processor core, ii) decrement the loaded value in the processor core, and iii) store the resulting value to memory, the subtraction is performed as a single, uninterruptible step. In this way, the "atomic_sub" operation is thread safe. If another thread executing on another processor core is simultaneously decrementing the same QoS credit count, the resulting value will be consistent based on the ensured atomicity. After the atomic decrement operation is successfully performed, QOS Credit Consumer Logic 159 causes the command to be processed. For example, after the atomic decrement operation is performed, QoS Credit Consumer Logic 159 completes and returns SUCCESS to Transport Driver 132. The returned SUCCESS status from QoS Credit Consumer Logic 159 causes Transport Driver 132 to allocate any pages of memory needed to temporarily store host data while processing the command (e.g. using Data Pages Allocator 148 to allocate the necessary pages of memory from Data Pages Pool 150 if such pages have not previously been allocated), and to then pass the command (e.g. a command descriptor for the command and any allocated pages of memory) to Command Processing Logic 146, which then completes processing of the command.

For each one of the NVMe commands in NVMe Commands 130 for which QoS Credit Consumer Logic 159 determines that the QoS wait queue in the QoS bucket for the command is non-empty, and for each one of NVMe commands in NVMe Commands 130 for which QoS Credit Consumer Logic 159 determines that the number of credits required to process the command is larger than the QoS credit count in the QoS bucket for the command, QOS Credit Consumer Logic 159 reads the lock flag in the QoS bucket for the command to determine whether the lock flag is set. The lock flag is initially read using an ordinary memory read operation, in order to avoid unnecessarily having to perform the more costly atomic operation that is used to set the lock flag. If the lock flag is determined to be set, then the QoS bucket is currently being used by another thread executing QoS Credit Consumer Logic 159 for a different command directed to the same storage volume. In response to a determination that the lock flag in the QoS bucket for the command is set, QoS Credit Consumer Logic 159 enqueues a command descriptor for the command onto the QoS wait queue in the QoS bucket for the command. For example, a "llist_add" operation may be used by QoS Credit Consumer Logic 159 to add a command descriptor to the QoS wait queue without locking the QoS wait queue, by iteratively performing an atomic operation that attempts to add the command descriptor to the QoS wait queue until a determination is made that no other thread has asynchronously added another command descriptor to the QoS wait queue. Such an atomic operation may, for example, include or consist of performing a "atomic_cmpxchg" operation that atomically compares a variable to a given value and writes a new value to the variable only if the variable and the given value match. After QOS Credit Consumer Logic 159 enqueues the command descriptor to the QoS wait queue, QoS Credit Consumer Logic 159 completes and returns WAIT to Transport Driver 132, indicating that the command has been enqueued onto the QoS wait queue and cannot be processed at the current time.

In response to a determination that the lock flag in the QoS bucket for the command is not set, QoS Credit Consumer Logic 159 i) performs an atomic operation to set the lock flag in the QoS bucket for the command, and ii) performs credits generation for the QoS bucket for the command. For example, the "atomic_cmpxchg" operation described above may be used to set the lock flag in the QoS bucket for the command.

QOS Credit Consumer Logic 159 may perform credits generation for the QoS bucket for the command by calling QoS Credit Generation Logic 160. QOS Credit Generation Logic 160 performs credits generation for the QoS bucket for the command by calculating an amount of time since credits generation was last performed for the QoS bucket for the command, and then comparing the amount of time since credits generation was last performed for the QoS bucket for the command to a minimum credit generation time period. In response to determining that the amount of time since credits generation was last performed for the QoS bucket for the command is less than the minimum credit generation time period, QoS Credit Generation Logic 160 completes credits generation for the QoS bucket for the command without generating any new credits for the QoS bucket, and returns to QoS Credit Consumer Logic 159. In response to determining that the amount of time since credits generation was last performed for the QoS bucket for the command is at least as large as the minimum credit generation time period, QoS Credit Generation Logic 160 first calculates an amount of new credits for the QoS bucket for the command based on the QoS policy for the QoS bucket and the amount of time since credits generation was last performed for the QoS bucket for the command. QoS Credit Generation Logic 160 then stores a result of adding the amount of new credits calculated for the QoS bucket for command to the QoS credit count in the QoS bucket for the command into a local credit count variable. Then, for each command descriptor in the QoS wait queue in the QoS bucket for which there are sufficient credits remaining in the local credit count to process the corresponding command, QoS Credit Generation Logic 160 performs the steps of i) processing the corresponding command, and ii) subtracting the number of credits required to process the corresponding command from the local credit count. The resulting local credit count is then stored into the QoS credit count in the QoS bucket for the command, credits generation is completed for the QoS bucket for the command, and QoS Credit Generation Logic 160 returns to QoS Credit Consumer Logic 159.

For each one of the NVMe commands in NVMe Commands 130 for which QoS Credit Consumer Logic 159 determines that the QoS wait queue in the QoS bucket for the command is non-empty, and for each one of NVMe commands in NVMe Commands 130 for which QoS Credit Consumer Logic 159 determines that the number of credits required to process the command is larger than the QoS credit count in the QoS bucket for the command, after QoS credit generation for the command is completed and QoS Credit Generation Logic 160 returns, QoS Credit Consumer Logic 159 clears the lock flag in the QoS bucket for the command, and, in response to i) determining that the Qos wait queue in the QoS bucket for the command is empty, and ii) determining that the QoS credit count in the QoS bucket for the command is at least as large as the number of credits required to process the host I/O command, i) performs an atomic operation (e.g. "atomic_sub") that subtracts the total number of credits required to process the command from the QoS credit count in the QoS bucket for the command without locking the QoS bucket for the command, and ii) completes and returns SUCCESS to Transport Driver 132. The returned SUCCESS status from QoS Credit Consumer Logic 159 causes Transport Driver 132 to allocate any pages of memory that may be needed to temporarily store host data while processing the command (e.g. using Data Pages Allocator 148 to allocate the necessary pages of memory from Data Pages Pool 150), and to then pass the command (e.g. a command descriptor for the command and any allocated pages of memory) to Command Processing Logic 146, which then completes processing of the command. Otherwise, in the event that either the QoS wait queue in the QoS bucket for the command is non-empty, or the QoS credit count in the QoS bucket for the command is not as large as the number of credits required to process the host I/O command, Qos Credit Consumer Logic 159 enqueues the command descriptor to the QoS wait queue in the QoS bucket, and QoS Credit Consumer Logic 159 completes and returns WAIT to Transport Driver 132, indicating that the command has been enqueued onto the QoS wait queue and cannot be processed at the current time.

Figure 2:
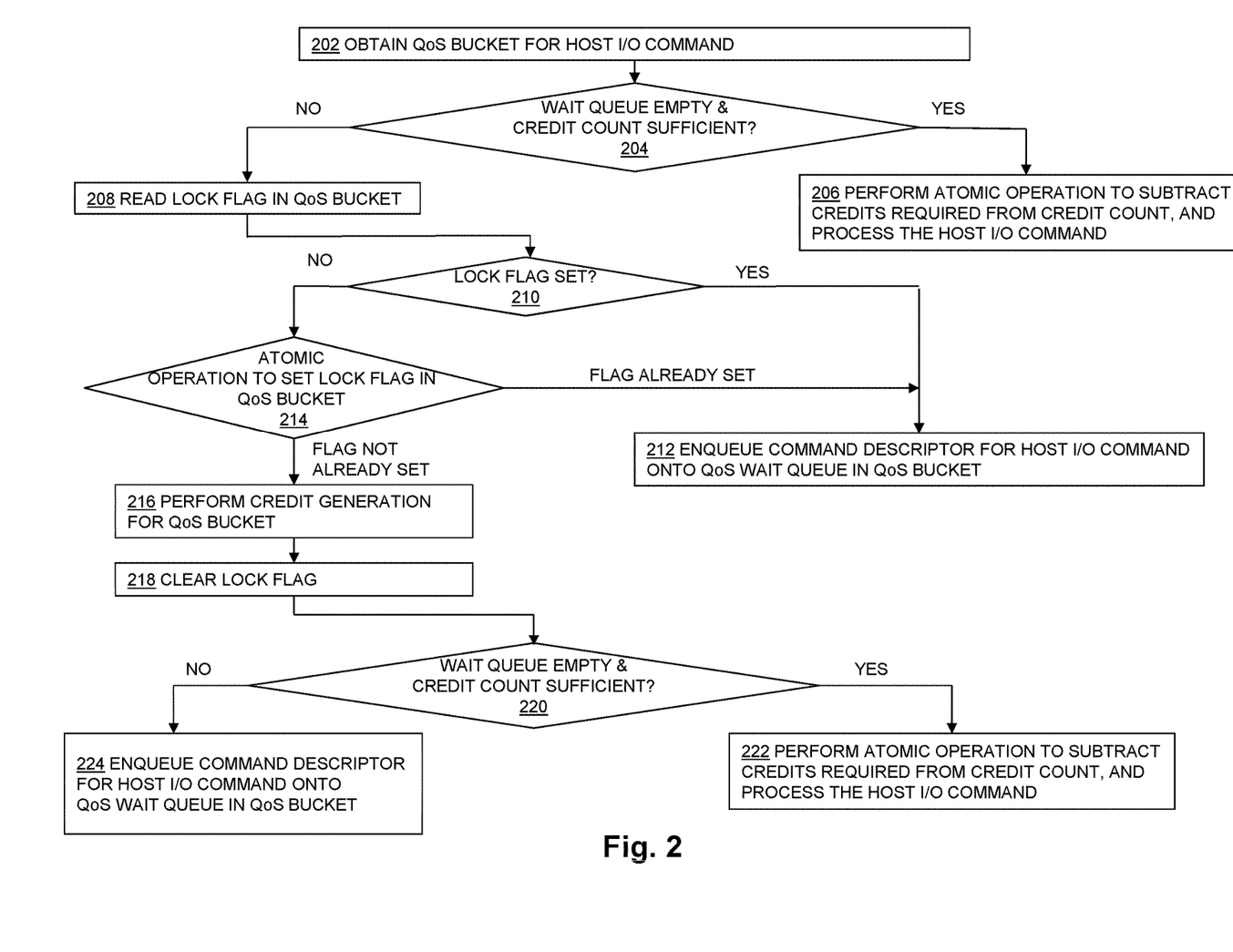
FIG. 2 is a flow chart showing an example of steps performed in some embodiments by QoS credit consumer logic while performing QoS enforcement.

FIG. 2 is a flow chart showing an example of steps performed in some embodiments by QoS credit consumer logic (e.g. QoS Credit Consumer Logic 159 shown in FIG. 1) while performing QoS enforcement. The steps of FIG. 2 may be performed for each received NVMe command.

When it is invoked, the QoS credit consumer logic first disables local CPU preemption on the processor core on which it is executing. CPU preemption is reenabled by QoS credit consumer logic when the QoS credit consumer logic completes and returns.

At step 202, the QoS credit consumer logic obtains the QoS bucket for the NVMe command for which QoS enforcement is being performed. For example, the credit consumer logic obtains and stores a pointer to the QoS bucket for the command using a single memory access, so that subsequent operations on the QoS bucket can be performed during execution of the QoS credit consumer logic using the pointer without having to re-access a QoS bucket lookup table, which may be subject to concurrent modifications.

At step 204, the QoS credit consumer logic determines whether the QoS wait queue in the QoS bucket for the command is empty, and whether a current value of the QoS credit count in that QoS bucket is at least as large as the number of credits required to process the command. In response to determining that the QoS bucket for the command is empty, and that the current value of the QoS credit count in that QoS bucket is at least as large as the number of credits required to process the command, step 204 is followed by step 206. Otherwise, step 204 is followed by step 208.

At step 206, the QoS credit consumer logic performs an atomic decrement operation (e.g. "atomic_sub") that subtracts the number of credits required to process the command from the QoS credit count in the QoS bucket for the command without locking the QoS bucket for the host I/O command. Further at step 206, after the atomic decrement operation is performed, the QoS credit consumer logic completes and returns SUCCESS to the transport driver (e.g. Transport Driver 132), causing the transport driver to allocate any pages of memory needed to temporarily store host data while processing the command if such pages have not previously been allocated, and to then pass a command descriptor for the command and any allocated pages of memory to the command processing logic (e.g. Command Processing Logic 146), which then completes processing of the command.

At step 208, the QoS credit consumer logic uses an ordinary memory read operation to read the lock flag in the QoS bucket for the command to determine whether the lock flag is set at step 210. If the lock flag is determined to be set at step 210, step 210 is followed by step 212. Otherwise, step 210 is followed by step 214.

At step 212, the QoS bucket for the command is currently being used by another thread executing the QoS credit consumer logic for a different command directed to the same storage volume. Accordingly, the QoS credit consumer logic 159 enqueues a command descriptor for the command onto the QoS wait queue in the QoS bucket for the command without locking the QoS wait queue, e.g. using the "llist_add" operation that iteratively performs an atomic operation (e.g. "atomic_cmpxchg") that attempts to add the command descriptor to the QoS wait queue until a determination is made that no other thread has asynchronously added another command descriptor to the QoS wait queue, at which point the command descriptor is added to the QoS wait queue. After the command descriptor for the command is enqueued to the QoS wait queue, the QoS credit consumer logic completes and returns WAIT to the transport driver, indicating that the command has been enqueued onto the QoS wait queue and cannot be processed at the current time.

At step 214, the QoS credit consumer logic performs an atomic operation (e.g. "atomic_cmpxchg") to attempt to set the lock flag in the QoS bucket for the command. The atomic operation performed at step 214 is successful if it finds that the lock flag was not already asynchronously set by another concurrent thread when it is performed. If the atomic operation performed at step 214 is not successful, step 214 is followed by step 212. Otherwise, in the case where the lock flag was not already set, step 214 is followed by step 216.

Figure 3:
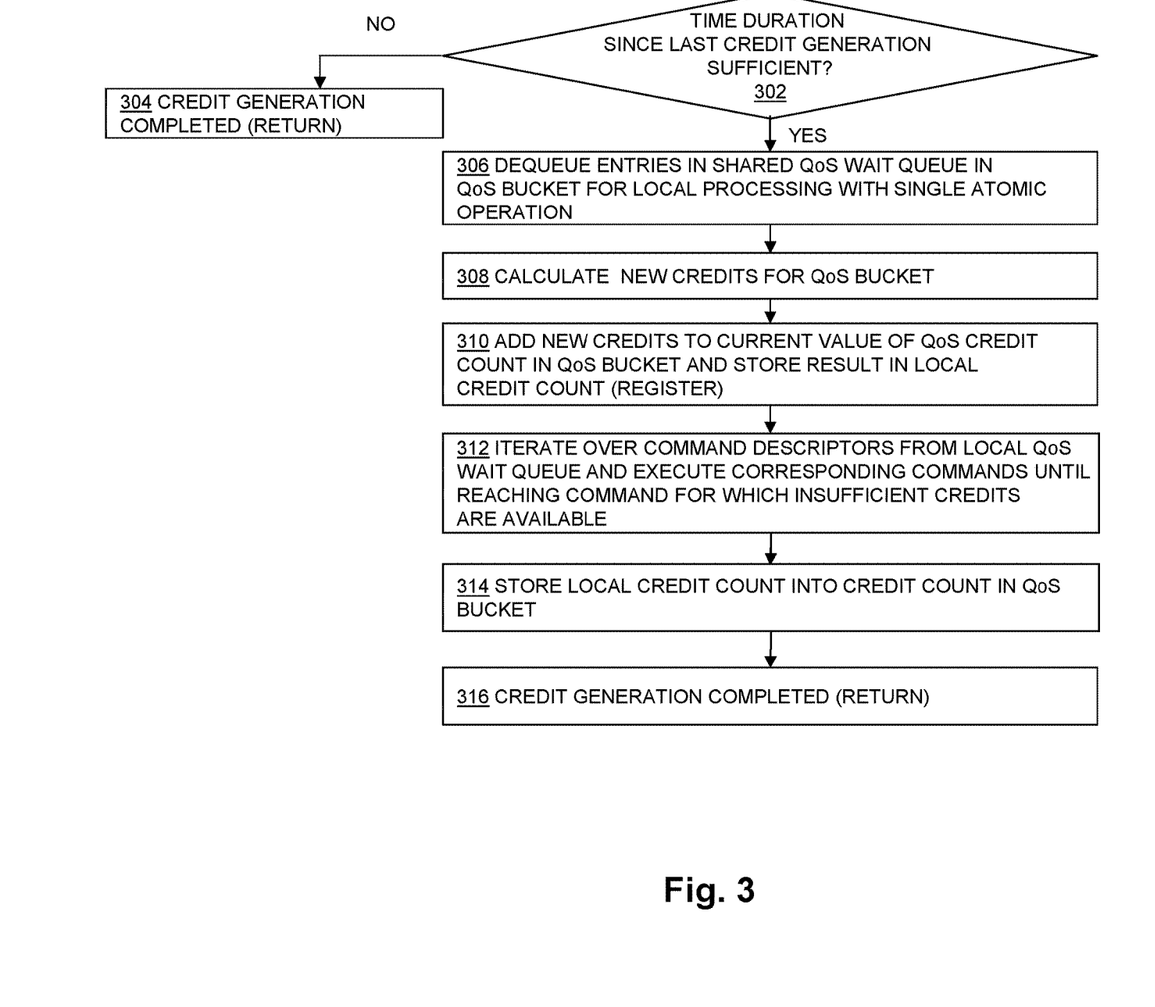
FIG. 3 is a flow chart showing an example of steps performed in some embodiments by QoS credit generation logic to perform credit generation.

At step 216, the QoS credit consumer logic performs credit generation per the steps shown in FIG. 3, for example, by performing a synchronous call to the QoS credit generation logic (e.g. QoS Credit Generation Logic 160). When the QoS credit generation logic returns, step 216 is followed by step 218.

At step 218, the QoS credit consumer logic clears the lock flag in the QoS bucket for the command.

At step 220, the QOS credit consumer logic determines whether, after performing credit generation at step 216, the QoS wait queue in the QoS bucket for the command is now empty, and whether the value of the QoS credit count in that Qos bucket is now at least as large as the number of credits required to process the command. In response to determining that the QoS bucket for the command is now empty, and that the current value of the QoS credit count in that QoS bucket is now at least as large as the number of credits required to process the command, step 220 is followed by step 222. Otherwise, step 220 is followed by step 224.

At step 222, the QoS credit consumer logic performs an atomic decrement operation (e.g. "atomic_sub") that subtracts the number of credits required to process the command from the QoS credit count in the QoS bucket for the command without locking the QoS bucket for the host I/O command. Further at step 222, after the atomic decrement operation is performed, the QoS credit consumer logic completes and returns SUCCESS to the transport driver (e.g. Transport Driver 132), causing the transport driver to allocate any pages of memory needed to temporarily store host data while processing the command if such pages have not previously been allocated, and to then pass a command descriptor for the command and any allocated pages of memory to the command processing logic (e.g. Command Processing Logic 146), which then completes processing of the command.

At step 224, the QoS credit consumer logic 159 enqueues a command descriptor for the command onto the QoS wait queue in the QoS bucket for the command without locking the QoS wait queue, e.g. using the "llist_add" operation that iteratively performs an atomic operation (e.g. "atomic_cmpxchg") that attempts to add the command descriptor to the QoS wait queue until a determination is made that no other thread has asynchronously added another command descriptor to the QoS wait queue, at which point the command descriptor is added to the QoS wait queue. After the command descriptor for the command is enqueued to the QoS wait queue, the QoS credit consumer logic completes and returns WAIT to the transport driver, indicating that the command has been enqueued onto the QoS wait queue and cannot be processed at the current time.

FIG. 3 is a flow chart showing an example of steps performed in some embodiments by QoS credit generation logic (e.g. QoS Credit Generation Logic 160) to perform credit generation, e.g. when the QoS credit generation logic is called at step 216 in FIG. 2.

At step 302, the QoS credit generation logic calculates an amount of time since credits generation was last performed for the QoS bucket for the command (e.g. by subtracting a time at which credits generation was last performed for the QoS bucket for the command from a current time), and comparing that amount of time to a minimum credit generation time period. In response to determining that the amount of time since credits generation was last performed for the QoS bucket for the command is less than the minimum credit generation time period, step 302 is followed by step 304. Otherwise, step 302 is followed by step 306.

At step 304, the QoS credit generation logic completes credits generation for the QoS bucket for the command without generating any new credits for the QoS bucket, and returns to QoS credit consumer logic.

At step 306, in response to determining that the amount of time since credits generation was last performed for the QoS bucket for the command is at least as large as the minimum credit generation time period, the QoS credit generation logic dequeues all the entries in the shared QoS wait queue that is contained in the QoS bucket using a single atomic operation, and adds those entries to a local QoS wait queue for the QoS bucket that is private to the QoS credit generation logic. Such a single atomic operation may, for example, consist of or include an atomic exchange operation ("atomic_xchg") that atomically reads an existing value and writes a new value to a variable.

At step 308, the QoS credit generation logic calculates an amount of new credits for the QoS bucket for the command based on the QoS policy for the QoS bucket and the amount of time since credits generation was last performed for the QoS bucket for the command. For example, in the case of a maximum bandwidth QoS policy that sets a per second maximum bandwidth limit in bytes, and where each credit equals one byte, the amount of new credits is the per second limit times the number of seconds since the last credits generation. Specifically, for a maximum bandwidth limit of ten megabytes (10 MB) per second, where each credit is equal to one byte, and where the amount of time since credits generation was last performed for the QoS bucket is five seconds, the amount of new credits calculated at step 308 is 52,428,800.

At step 310, the QoS credit generation logic stores a result of adding the amount of new credits calculated at step 308 to the QoS credit count in the QoS bucket for the command into a local credit count variable.

At step 312, for each command descriptor in the local QOS wait queue for which there are sufficient credits remaining in the local credit count variable to process the corresponding command, the QoS credit generation logic performs the steps of i) processing the corresponding command, and ii) subtracting the number of credits required to process the corresponding command from the local credit count. When a command descriptor is reached in the local QoS wait queue for which there are insufficient credits remaining in the local credit count variable to process the corresponding command, step 312 is followed by step 314.

At step 314, the resulting value of the local credit count after step 312 is stored into the QoS credit count in the QoS bucket for the command.

At step 316 credits generation is completed for the QoS bucket for the command, a time stamp indicating the time at which credit generation was last completed for the QoS bucket for the command is generated and stored in association with that Qos bucket, and the QoS credit generation logic returns to the QoS credit consumer logic.

Figure 4:
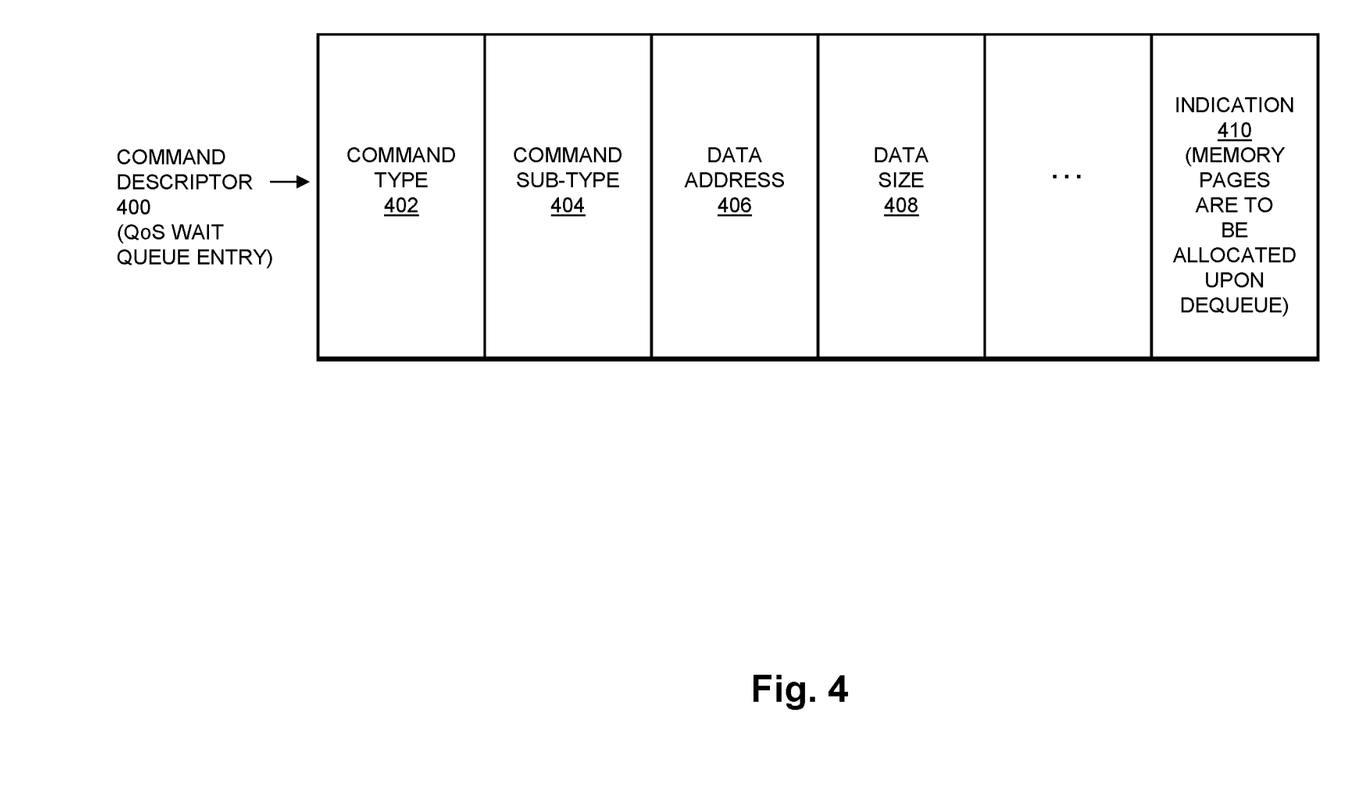
FIG. 4 is a block diagram showing an example of a command descriptor in a QoS wait queue in some embodiments.

FIG. 4 is a block diagram showing an example of some of the fields in a Command Descriptor 400 for a host I/O command, e.g. for an NVMe command that is enqueued to a QoS wait queue. Some fields of the Command Descriptor 400 may be populated by and transmitted from the host as part of a host I/O command, and indication 410 may be added by the transport driver.

Command Type 402 may indicate the type of command, e.g. read, write, compare, write-zero, data set management (DSM), etc.

Command Sub-Type 404 may be used to indicate a command sub-type. For example Command Sub-Type 404 may indicate that the host has transmitted the host data to be written to non-volatile data storage together with the command, as in an in-capsule write command, or alternatively that the host has not transmitted the host data to be written together with the command, in which case a ready-to-transfer message must be sent to the host to cause the host to transmit the host data to the data storage system that is to be written to non-volatile data storage.

Data Address 406 may contain an address (e.g. logical address) associated with the command. For example, in the case of a read command, Data Address 406 may be a starting address or offset from which data is requested to be read from the non-volatile data storage of the data storage system and returned to the host. In another example, in the case of a write command or DSM command, Data Address 406 may be the starting address or offset at which the data transmitted from the host is to be stored in non-volatile data storage of the data storage system. In another example, in the case of a write-zeros command, Data Address 406 may be a starting address or offset of a range of logical addresses into which zeros are to be written.

Data Size 408 may contain the size of the host data. For example, in the case of a read command, Data Size 408 may indicate the amount of data to be read and returned to the host. In another example, in the case of a write command, Data Size 408 may indicate the amount of host data transmitted from the host that is to be written to non-volatile data storage. In another example, in the case of a write-zeros command, Data Size 408 may indicate the size of the address range into which zeros are to be written.

Indication 410 may be a flag or the like indicating whether upon Command Descriptor 400 being dequeued from a QoS wait queue, any memory pages needed to temporarily store host data while the command is being processed need to be allocated. For example, in the case of a read command, Indication 410 may indicate that when Command Descriptor 400 is dequeued from a QoS wait queue, memory pages must be allocated for temporarily storing the host data requested read from non-volatile data storage and then subsequently returned to the host.

Figure 5:
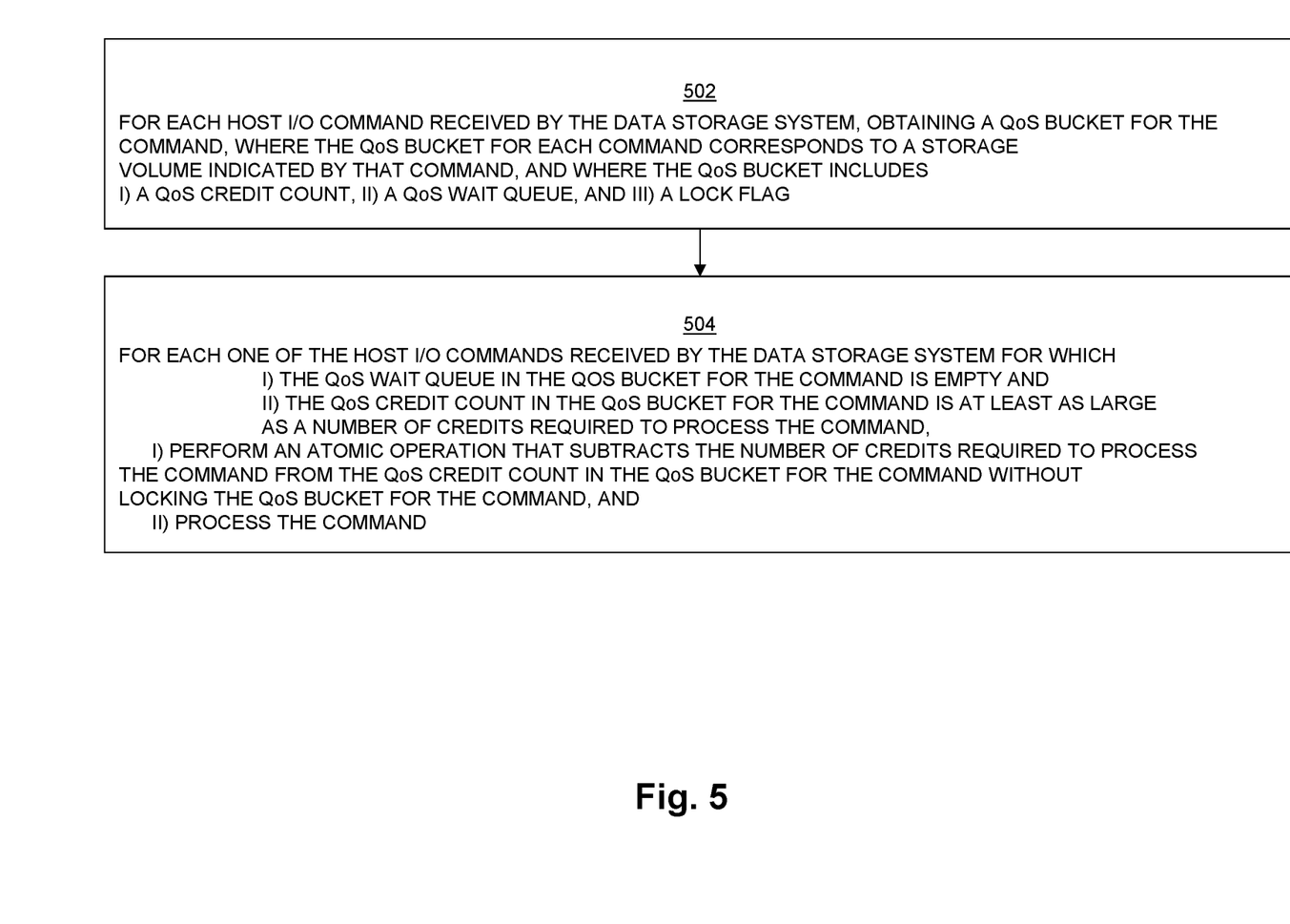
FIG. 5 is a flow chart showing an example of steps performed in some embodiments to perform QoS policy enforcement by a transport driver that initially receives host I/O commands (e.g. NVMe commands) in a data storage system.

FIG. 5 is a flow chart showing an example of steps performed in some embodiments to perform QoS policy enforcement by a transport driver that initially receives host I/O commands (e.g. NVMe commands) in a data storage system.

At step 502, for each one of the host I/O commands (e.g. each NVMe command) received by the data storage system, a QoS bucket is obtained for the command. The QoS bucket for each command corresponds to a storage volume indicated by that command. The QoS bucket includes i) a QoS credit count, ii) a QoS wait queue, and iii) a lock flag.

At step 504, for each one of the host I/O commands received by the data storage system for which i) the QoS wait queue in the QoS bucket for the command is empty and ii) the QoS credit count in the QoS bucket for the command is at least as large as a number of credits required to process the command, i) perform an atomic operation that subtracts the total number of credits required to process the command from the QoS credit count in the QoS bucket for the command without locking the QoS bucket for the command, and ii) process the command.

As will be appreciated by those skilled in the art, aspects of the technology disclosed herein may be embodied as a system, method, or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing Quality of Service (QOS) enforcement in a data storage system, comprising:
   for each host I/O command received by the data storage system, obtaining a QoS bucket for the host I/O command, wherein the QoS bucket for each host I/O command corresponds to a storage volume indicated by that host I/O command, and wherein the QoS bucket includes i) a QoS credit count, ii) a QoS wait queue, and iii) a lock flag;
   for each host I/O command received by the data storage system for which i) the QoS wait queue in the QoS bucket for the host I/O command is empty and ii) the QoS credit count in the QoS bucket for the host I/O command is at least as large as a number of credits required to process the host I/O command, i) performing an atomic operation that subtracts the number of credits required to process the host I/O command from the QoS credit count in the QoS bucket for the host I/O command without locking the QoS bucket for the host I/O command, and ii) processing the host I/O command; and
   for each host I/O command received by the data storage system for which the QoS wait queue is non-empty and for each one of the host I/O commands for which the number of credits required to process the host I/O command is larger than the QoS credit count in the QoS bucket for the host I/O command:
      reading the lock flag in the QoS bucket for the host I/O command to determine whether the lock flag is set,
      in response to determining that the lock flag in the QoS bucket for the host I/O command is set, enqueuing a command descriptor for the host I/O command onto the QoS wait queue in the QoS bucket for the host I/O command, and
      in response to determining that the lock flag in the Qos bucket for the host I/O command is not set, i) performing an atomic operation to set the lock flag in the QoS bucket for the host I/O command, and ii) performing credits generation for the QoS bucket for the host I/O command.

2. The method of claim 1, wherein performing credits generation for the QoS bucket for the host I/O command comprises:
   calculating an amount of time since credits generation was last performed for the QoS bucket for the host I/O command;
   comparing the amount of time since credits generation was last performed for the QoS bucket for the host I/O command to a minimum credit generation time period; and
   in response to the amount of time since credits generation was last performed for the QoS bucket for the host I/O command being less than the minimum credit generation time period, completing credits generation for the QoS bucket for the host I/O command without generating any new credits for the QoS bucket.

3. The method of claim 2, wherein performing credits generation for the QoS bucket for the host I/O command further comprises, in response to the amount of time since credits generation was last performed for the QoS bucket for the host I/O command being at least as large as the minimum credit generation time period:
   calculating new credits for the QoS bucket for the host I/O command based on a QoS policy for the QoS bucket and the amount of time since credits generation was last performed for the QoS bucket for the host I/O command;
   storing a result of adding the new credits for the QoS bucket for the host I/O command to the QoS credit count in the QoS bucket for the host I/O command into a local credit count;
   for each command descriptor in the QoS wait queue in the QoS bucket for the host I/O command:
      i) processing a corresponding host I/O command, and
      ii) subtracting a number of credits that is required to process the corresponding host I/O command from the local credit count;
   storing the local credit count into the QoS credit count in the QoS bucket for the host I/O command; and
   completing credits generation for the QoS bucket for the host I/O command.

4. The method of claim 3, further comprising, for each host I/O command received by the data storage system for which the QoS wait queue is non-empty and for each host I/O command received by the data storage system for which the number of credits required to process the host I/O command is larger than the QoS credit count in the QoS bucket for the host I/O command, performing the following steps after credits generation for the QoS bucket for the host I/O command is completed:
   clearing the lock flag in the QoS bucket for the host I/O command; and
   in response to i) the QoS wait queue in the QoS bucket for the host I/O command being empty, and ii) the QoS credit count in the QoS bucket for the host I/O command being at least as large as the number of credits required to process the host I/O command, i) performing an atomic operation that subtracts the number of credits required to process the host I/O command from the QoS credit count in the QoS bucket for the host I/O command without locking the QoS bucket for the host I/O command, and ii) processing the host I/O command.

5. The method of claim 1, wherein each QoS bucket further includes a QoS policy that sets a limit on maximum bandwidth in bytes per second; and
   wherein each credit is equal to a predetermined number of bytes.

6. The method of claim 5, wherein each QoS bucket corresponds to a respective one of a plurality of storage volumes in non-volatile storage of the data storage system; and wherein each QoS policy in each QoS bucket sets a limit on maximum bandwidth with regard to the respective one the plurality of storage volumes.

7. The method of claim 6, wherein each host I/O command received by the data storage system comprises an NVMe (Non-Volatile Memory Express) command received from a remote host; and wherein each QoS policy in each QoS bucket is defined by the host.

8. A data storage system comprising:

processing circuitry and a memory;

non-volatile data storage drives; and wherein the memory has program code stored thereon, wherein the program code, when executed by the processing circuitry, provides Quality of Service (QOS) enforcement by causing the processing circuitry to:

for each host I/O command received by the data storage system, obtain a QoS bucket for the host I/O command, wherein the QoS bucket for each host I/O command corresponds to a storage volume indicated by that host I/O command, and wherein the QoS bucket includes i) a QoS credit count, ii) a QoS wait queue, and iii) a lock flag;

for each host I/O command received by the data storage system for which i) the QoS wait queue in the QoS bucket for the host I/O command is empty and ii) the QoS credit count in the QoS bucket for the host I/O command is at least as large as a number of credits required to process the host I/O command, i) perform an atomic operation that subtracts the number of credits required to process the host I/O command from the QoS credit count in the QoS bucket for the host I/O command without locking the QoS bucket for the host I/O command, and ii) process the host I/O command; and for each host I/O command received by the data storage system for which the QoS wait queue is non-empty and for each one of the host I/O commands for which the number of credits required to process the host I/O command is larger than the QoS credit count in the QoS bucket for the host I/O command:

read the lock flag in the QoS bucket for the host I/O command to determine whether the lock flag is set, in response to a determination that the lock flag in the QoS bucket for the host I/O command is set, enqueue a command descriptor for the host I/O command onto the QoS wait queue in the QoS bucket for the host I/O command, and in response to a determination that the lock flag in the QoS bucket for the host I/O command is not set, i) perform an atomic operation to set the lock flag in the Qos bucket for the host I/O command, and ii) perform credits generation for the QoS bucket for the host I/O command.

9. The data storage system of claim 8, wherein the program code, when executed by the processing circuitry, further causes the processing circuitry to perform credits generation for the QoS bucket for the host I/O command at least in part by causing the processing circuitry to:

calculate an amount of time since credits generation was last performed for the QoS bucket for the host I/O command;

compare the amount of time since credits generation was last performed for the QoS bucket for the host I/O command to a minimum credit generation time period; and in response to the amount of time since credits generation was last performed for the QoS bucket for the host I/O command being less than the minimum credit generation time period, complete credits generation for the QoS bucket for the host I/O command without generating any new credits for the QoS bucket.

10. The data storage system of claim 9, wherein the program code, when executed by the processing circuitry, further causes the processing circuitry to perform credits generation for the QoS bucket for the host I/O command at least in part by causing the processing circuitry to:

in response to the amount of time since credits generation was last performed for the QoS bucket for the host I/O command being at least as large as the minimum credit generation time period:

calculate new credits for the QoS bucket for the host I/O command based on a QoS policy for the QoS bucket and the amount of time since credits generation was last performed for the QoS bucket for the host I/O command;

store a result of adding the new credits for the QoS bucket for the host I/O command to the QoS credit count in the QoS bucket for the host I/O command into a local credit count;

for each command descriptor in the QoS wait queue in the QoS bucket for the host I/O command:

i) process a corresponding host I/O command, and ii) subtract a number of credits that is required to process the corresponding host I/O command from the local credit count;

store the local credit count into the QoS credit count in the QoS bucket for the host I/O command; and complete credits generation for the QoS bucket for the host I/O command.

11. The data storage system of claim 10, wherein the program code, when executed by the processing circuitry, further causes the processing circuitry to:

for each host I/O command received by the data storage system for which the QoS wait queue is non-empty and for each host I/O command received by the data storage system for which the number of credits required to process the host I/O command is larger than the QoS credit count in the QoS bucket for the host I/O command, after credits generation for the QoS bucket for the host I/O command is completed:

clear the lock flag in the QoS bucket for the host I/O command; and in response to i) the QoS wait queue in the QoS bucket for the host I/O command being empty, and ii) the QoS credit count in the QoS bucket for the host I/O command being at least as large as the number of credits required to process the host I/O command, i) perform an atomic operation that subtracts the number of credits required to process the host I/O command from the QoS credit count in the QoS bucket for the host I/O command without locking the QoS bucket for the host I/O command, and ii) process the host I/O command.

12. The data storage system of claim 8, wherein each QoS bucket further includes a QoS policy that sets a limit on maximum bandwidth in bytes per second; and wherein each credit is equal to a predetermined number of bytes.

13. The data storage system of claim 12, wherein each QoS bucket corresponds to a respective one of a plurality of storage volumes located in the non-volatile data storage drives; and wherein each QoS policy in each QoS bucket sets a limit on maximum bandwidth with regard to the respective one the plurality of storage volumes.

14. The data storage system of claim 13, wherein each host I/O command received by the data storage system comprises an NVMe (Non-Volatile Memory Express) command received from a remote host; and wherein each QoS policy in each QoS bucket is defined by the host.

15. A computer program product including a non-transitory computer readable medium having instructions stored thereon, wherein the instructions, when executed on processing circuitry, cause the processing circuitry to perform steps including:

for each host I/O command received by the data storage system, obtaining a QoS bucket for the host I/O command, wherein the QoS bucket for each host I/O command corresponds to a storage volume indicated by that host I/O command, and wherein the QoS bucket includes i) a QoS credit count, ii) a QoS wait queue, and iii) a lock flag;

for each host I/O command received by the data storage system for which i) the QoS wait queue in the QoS bucket for the host I/O command is empty and ii) the QoS credit count in the QoS bucket for the host I/O command is at least as large as a number of credits required to process the host I/O command, i) performing an atomic operation that subtracts the number of credits required to process the host I/O command from the QoS credit count in the QoS bucket for the host I/O command without locking the QoS bucket for the host I/O command, and ii) processing the host I/O command;

for each host I/O command received by the data storage system for which the QoS wait queue is non-empty and for each one of the host I/O commands for which the number of credits required to process the host I/O command is larger than the QoS credit count in the QoS bucket for the host I/O command:

read the lock flag in the QoS bucket for the host I/O command to determine whether the lock flag is set, in response to a determination that the lock flag in the QoS bucket for the host I/O command is set, enqueue a command descriptor for the host I/O command onto the QoS wait queue in the QoS bucket for the host I/O command, and in response to a determination that the lock flag in the Qos bucket for the host I/O command is not set, i) perform an atomic operation to set the lock flag in the QoS bucket for the host I/O command, and ii) perform credits generation for the QoS bucket for the host I/O command.

* * * * *